United States Patent [19]
Epstein et al.

[11] Patent Number: 5,972,518
[45] Date of Patent: Oct. 26, 1999

[54] CORROSION PROTECTION OF IRON/STEEL BY EMERALDINE BASE POLYANILINE

[75] Inventors: Arthur J. Epstein, Bexley, Ohio; Shashi G. Jasty, Mequon, Wis.

[73] Assignee: The Ohio State University, Columbus, Ohio

[21] Appl. No.: 08/901,246

[22] Filed: Jul. 28, 1997

Related U.S. Application Data

[60] Provisional application No. 60/022,794, Jul. 30, 1996.
[51] Int. Cl.$^6$ .............................. B05D 3/12; B05D 7/14; B32B 15/08
[52] U.S. Cl. ......................... 428/461; 427/292; 427/295; 427/309; 427/327; 427/388.1; 427/443.1
[58] Field of Search ..................................... 427/327, 307, 427/388.1, 388.2, 388.5, 295, 58, 443.1, 292, 309; 428/461, 457

[56] References Cited

U.S. PATENT DOCUMENTS

| | | | |
|---|---|---|---|
| 4,822,638 | 4/1989 | Yaniger | 427/79 |
| 5,079,334 | 1/1992 | Epstein et al. | 427/421 |
| 5,137,991 | 8/1992 | Epstein et al. | 525/540 |
| 5,441,772 | 8/1995 | McAndrew et al. | 427/388.2 |
| 5,532,025 | 7/1996 | Kinlen et al. | 427/388.1 |
| 5,543,084 | 8/1996 | Kinlen et al. | 525/500 |
| 5,645,890 | 7/1997 | MacDiarmid et al. | 427/421 |
| 5,648,416 | 7/1997 | Miller et al. | 524/500 |
| 5,658,649 | 8/1997 | Wrobleski et al. | 428/215 |
| 5,721,056 | 2/1998 | Wrssling | 427/333 |

OTHER PUBLICATIONS

"Anodic Synthesis of Polyaniline Coatings", Mengoli et al., J. Appl. Polym. Sci., vol. 26, pp. 4247–4257, 1981.
N. Ahmad and A.G. MacDiarmid, *Synth Met.* 78 (1996) 103.–110. (no month).
Passivation of Metals by Coating with Polyaniline: Corrosion Potential Shift and Morphological Changes.
B. Wessling, *Adv. Mater.* 6 (1994) 226 and 228 )p. 227 missing) no month.
D.W. DeBerry, *J. Electrochem. Soc. 132* (1985) 1022. (no month).
W–K.Lu, R.L. Elsenbaumer, and B Wessling,. *Synth Met.* 71 (1995) 2163. (no month).
D.A. Wrobleski, B.C. Benicewicz, K.G. Thompson, and C.J. Bryan, *ACS Polymer Preprints 35* (1994) 265. (no month).
Y. Wei, J. Wang, X. Jia, J–M. Yeh, and P. Spellane, *Polymeric Materials Science & Engineering* 72 (1995) 563. (no month).
S. Jasty and A.J. Epstein, *Polymeric Materials Science & Engineering* 72 (1995) 565–566 (no month).
A.G. MacDiarmid, J.C. Chiang, A.F. Richter, N.L.D. Somasiri, and A.J. Epstein, in L. Alcear, (Ed.) *Conducting Polymers*, p 105 D. Reidel Publishing Co., Dodrecht, Netherlands, 1987. (no month).
N.S. McIntyre and D.G. Zetaruk, *Anal. Chem.*, 49(1977) 1521. Sep.
J.S. Corneille, J–W He, and D.W. Goodman, *Surf. Sci. 338* (1995) 211. (no month).
M. Seo, J.V. Lumsden, and R.W. Staehle, *Surf. Sci. 50* (1975) 541. (no month).

(List continued on next page.)

*Primary Examiner*—Diana Dudash
*Attorney, Agent, or Firm*—Standley & Gilcrest LLP

[57] ABSTRACT

In general terms, the method of the present invention is one for providing an anodic coating to a member having a metal surface being subject to oxidation. In broadest terms, the method comprises the steps of: (a) obtaining a member having a ferrous metal surface (i.e. the term "ferrous" intended as meaning containing iron without regard to oxidation state), the metal surface having one or more layer(s) of oxidized metal; (b) removing the layer(s) of oxidized metal from the ferrous metal surface; and (c) depositing one or more layer(s) of an emeraldine base polyaniline polymer onto the ferrous metal surface.

10 Claims, 6 Drawing Sheets

OTHER PUBLICATIONS

D.A. Channing and M.J. Graham, *Corr. Sci. 12* (1972) 271. (no month).

F Gazarini and G. Lanzavecchia, *Reactiv, Solids, Proc. Int. Symp., 6th* (1969), 1968, 57–64. Editors(s): J.W. Mitchell, Wiley–Intersci., New York, N.Y. (no month).

J. Robertson, Corr. Sci. 29 (1989) 1275. (no month).

Y. Mei, Z.J. Zhou, and H.L. Luo, *J. Appl. Phys. 61* (1987) 4388. Apr.

J. Nowotny and I. Sikora, *J. Electrochem. Soc. 125* (1978) 781.

*MRS Bulletin,* vol. 22(6) Jun. 1997.

CORROSION PROTECTION OF IRON/STEEL BY EMERALDINE BASE POLYANILINE

This application claims the benefit of U.S. Provisional Application Ser. No. 60/022,794 filed on Jul. 30, 1996.

TECHNICAL FIELD

The present invention is in the field of corrosion protection for ferrous metals.

BACKGROUND

The corrosion of steel has long been an important problem, causing losses in excess of 100 billion dollars annually world wide.[1] Various methods have been devised to combat corrosion, including chrome treatment of steel surfaces, pickling inhibitors, sacrificial zinc layers, etc.[2] In practice, almost all methods of corrosion protection work in one of the following ways: (i) cathodic protection, i.e., charge (e⁻) is donated to the steel from a sacrificial material, (ii) anodic protection, i.e., charge is withdrawn from the steel, or (iii) the steel surface is sealed off from corrosive attacks by a surface layer of another material, commonly a metal oxide.

Efforts are presently underway to develop methods of corrosion protection of steel that are more effective and also more environmentally friendly than the present techniques. Among the more frequently studied polymers used for corrosion protection of steel is polyaniline and its derivatives.[1,3-8] Although the initial work of DeBerry[4] studied electrochemically deposited polyaniline, later studies[1,3,5-8] concentrated on solution deposited polyaniline. Polyaniline has been proven to have corrosion protecting capabilities both when doped and neutral.[1,3-8]

The present invention provides an improvement to the use of emeraldine base polyaniline and its derivatives for providing an anodic coating to ferrous metals giving better performance, including greater resistance to corrosion, and greater throwing power.

In view of the present disclosure, or through practice of the present invention, benefits and the solution to problems in prior art methods and materials, may become apparent.

SUMMARY OF THE INVENTION

In the present invention, emeraldine base polyanilines (EBPs), based upon the basic structure shown in FIG. 1, are being used as a corrosion protecting coating, such as an undercoat, on steel and iron samples.

In general terms, the method of the present invention is one for providing an anodic coating to a member having a metal surface being subject to oxidation. In broadest terms, the method comprises the steps of: (a) obtaining a member having a ferrous metal surface (i.e. the term "ferrous" intended as meaning containing iron without regard to oxidation state), the metal surface having one or more layer(s) of oxidized metal; (b) removing the layer(s) of oxidized metal from the ferrous metal surface; and (c) depositing one or more layer(s) of an emeraldine base polyaniline polymer onto the ferrous metal surface.

The layer(s) of oxidized metal may be removed from the ferrous metal surface by any method known in the art, such as through abrasion polishing, etc. One may deposit the one or more layer(s) of an emeraldine base polyaniline polymer onto the ferrous metal surface before any substantial oxidation can reform (which will vary with ambient conditions), typically within a short time period on the order of minutes or hours, and typically well within 24 hours.

In general, the method may be used to apply the EBP to any desired ferrous metal surface or portion thereof. Such surfaces may be those on portions of the target member relatively more exposed to the corrosive environment, or on surfaces that arc less exposed or not exposed (the latter of which is preferred because the EBP is generally more protected from itself being damaged by the environment; the EBP working principally by anodic action rather than through its function as a barrier to oxidation).

The layer of EBP polymer atop the ferrous metal may be of any thickness, varying from those at monolayer levels, to layers measured in dimensions from nanometers to microns, depending upon the desired application. The EBP polymer may be applied to single or multiple surfaces, which may be interior (i.e., relatively lightly exposed or unexposed) surfaces or exterior (i.e., relatively exposed) surfaces. Optionally, the EBP polymer may cover all or part of any such surface, usually needing only enough contact to have the desired anodic effect.

The ferrous metals used in accordance with the methods, compositions and articles of the present invention may be any ferrous metal or alloy, such as those selected from the group consisting of iron and steel.

Any EBP polymer, oligomer or derivative (collectively referred to as herein as a class of compounds) may be used in accordance with the methods, compositions and articles of the present invention. Derivatives include those wherein the aniline ring structures are substituted, such as by lower alkyl groups.

The deposition method used for depositing the EBP onto the ferrous metal surface may be any appropriate method in accordance with the desired application, such as the well-characterized techniques of solution deposition, vacuum deposition and electrochemical deposition.

The present invention also includes members having an anodic coating prepared in accordance with the method of the present invention in its many embodiments.

In broadest terms the present invention further includes a member having a metal surface bearing an anodic coating, the member having a ferrous metal surface, the ferrous metal surface bearing an anodic coating comprising at least one layer of an emeraldine base polyaniline polymer so as to define an interface between the polymer and the ferrous metal surface, the interface being substantially free of metal oxide.

The present invention also includes a method of providing a ferrous metal layer onto an anodic polymer substrate, the method comprising the steps of: (a) obtaining a substrate of an anodic polymer, the anodic polymer selected from the group consisting of emeraldine base polyaniline polymers; and (b) depositing a layer of ferrous metal onto the substrate of an anodic polymer.

This method may be carried out using any metal deposition technique such as vacuum deposition, metal sputtering, and e-beam sputtering.

The layer of metal atop the EBP polymer may be of any thickness, varying from those at monolayer levels, to layers measured in dimensions from nanometers to microns, depending upon the desired application.

Herein are summarized results on the effect that different sample preparation methods have on the corrosion protection, with particular attention to the use of the emeraldine base (EB) form of polyaniline as the corrosion protective coating.

Emeraldine base polyaniline undercoats of the present invention were found to offer corrosion protection for both the cold rolled steel and iron samples. In accordance with the present invention, the degree of protection was found to vary significantly and in some cases unexpectedly depending on the thickness of the iron oxide layer at the polymer/metal interface as well as on the thickness of the top oxide layer. The best results were achieved when both the top and interfacial oxide layers were removed prior to the polymer deposition. The mechanism for corrosion protection was found to be anodic, i.e., the polyaniline film withdraws charge from the metal, passivating its surfaces against corrosion. For all samples studied, iron as well as cold rolled steel, the iron oxide structure consisted of a thin (~15 Å) layer of $Fe_2O_3$ followed by a thicker layer of $Fe_3O_4$ at the pure steel (iron) interface. Large values (up to ~1.5 cm) of throwing power were obtained for emeraldine base protected cold rolled steel. Using X-ray photoelectron spectroscopy, the anti-corrosion performance of various application methods of the emeraldine base layer was characterized, as was the mechanism for corrosion protection.

DETAILED DESCRIPTION OF THE PREFERRED EMBODIMENT

Figure 1:
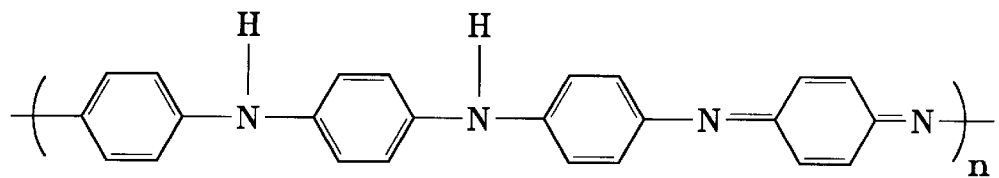
FIG. 1 is a chemical structure of the fundamental structure of polyaniline polymers which are known as emeraldine base polyaniline polymers for $0.3<y<0.7$.

In accordance with the foregoing summary of the invention, the following presents a detailed description of the present invention presented against the backdrop of uncoated metal surfaces, and those coated with EBP not in accordance with the present invention. The detailed description of the present invention presented is presently considered to be the best mode thereof.

Experimental Details

The steel samples used in the subject embodiments were A366 cold rolled steel (CRS) plates commercially obtained from LTV Steel. The steel samples were ultrasound cleaned in acetone and ethanol.

In some of the comparative experiments, one or both sides of the steel plates were polished using 320 emery paper. The polyaniline was chemically synthesized[9] in the emeraldine hydrochloride (ES-HCl) form and converted to EBP by washing with $NH_4OH$. The resulting powder was dissolved in N-methylpyrrolidinone (NMP) and solution cast onto the CRS samples, as shown in FIG. 2(a).

In this embodiment, the EBP films were cast on the back side of the samples, not on the surface to be protected. This is referred to as a protective undercoat. All CRS samples were handled in ambient air for a minimum of 12 hours before being exposed to the corrosive environment. Experiments also were carried out on iron sputtered onto films of EBP, as shown in FIG. 2(b). Again, the EBP polymer films are under the iron films to be protected, not covering them. Control samples of iron sputtered onto glass and polyimide were prepared as well. The iron sputtering was carried out in a Veeco MicroEtch Ion Mill using 99.999% pure iron and at a background vacuum of better than $7\times10^{-6}$ mbar, producing iron films of 350 Å thickness. These samples were handled in ambient air for at least 10 minutes before being exposed to the corrosive environment. Cold rolled steel samples for throwing power experiments were prepared with the protective undercoats covering only half of the back surface of the 1×3 $cm^2$ CRS plates used in those experiments, as depicted in FIG. 2(c).

The samples were exposed to a corrosive environment consisting of a high humidity chamber where the temperature was kept at 70° or 80° C., with exposure times varying from 24 hours to 7 days.

The extent of corrosion damage, if any, was then studied using X-ray photoelectron spectroscopy (XPS) depth profiling. In this technique, the surface is sputtered away, in situ, layer by layer using an argon ion sputtering gun, with XPS spectra being taken for each layer until pure iron is detected. In this way, the nature of the top oxide layer and the combined depth of the oxide layers present can be detected. Unfortunately, ion bombardment of $Fe_2O_3$ and $Fe_3O_4$ oxides will result in the partial conversion of the topmost monolayers of these oxides into FeO if the samples are kept in ultra high vacuum, whereas FeO and pure iron are not affected.[10] Hence it is impossible to directly differentiate between the three oxides after sputtering by studying the XPS spectra alone. The XPS spectrometer used was a VG Scientific ESCALAB MkII spectrometer using Mg Kα X-rays (1253.6 eV). The energy resolution for the settings used while taking the core level spectra were such that the full width at half maximum (FWHM) for the Au $4f_{7/2}$ peak was 1.2 eV. The diffusion pumped system maintained a vacuum better than $5\times10^{-9}$ mbar throughout the measurements.

Results and Discussion

The Fe $2p_{3/2}$ peak binding energy of $Fe_2O_3$ is 710.9 eV,[10] 709.6 eV for FeO,[11] 710.3 eV for $Fe_3O_4$,[11] 711.9 eV for FeOOH[10] and 706.7 eV for pure Fe.[11] Sputter-damaged $Fe_2O_3$ and $Fe_3O_4$ have Fe $2p_{3/2}$ binding energies between 709.7 to 710.1 eV.[10] $Fe_2O_3$ and FeOOH have nearly identical Fe 2p spectra with a broad shake-up peak centered roughly 8 eV to the high binding energy side of the Fe $2p_{3/2}$ peak.[10] The Fe 2p spectra of FeO and $Fe_3O_4$ are also quite similar to each other in both shape and binding energy except that FeO has a shake-up feature visible as a sharp shoulder at roughly 716 eV,[10,11] whereas $Fe_3O_4$ has no such feature. The FeO-like oxide layers created by sputter-damaged $Fe_2O_3$ and $Fe_3O_4$ also have such a shoulder, though not always as distinct.[10]

As prepared iron films on EBP, glass and polyimide were studied by XPS and the binding energy of the Fe $2p_{3/2}$ peak ranged between 710.8 to 711.0 eV for all samples, with a broad shake-up centered at 719 eV being visible.[8] Hence, all samples were found to have a top surface layer of $Fe_2O_3$. The phase of the oxide, α or γ, can not be determined by XPS since their spectra have the same binding energies and near identical shapes.[10] Though the nature of the underlying oxide could not be directly determined through XPS depth profiling earlier work shows that iron oxide grows in air or oxygen as $Fe_3O_4$ from the pure iron with the top oxide layer being converted to α- or γ-$Fe_2O_3$ depending on temperature and humidity.[2,10-15] The relative thickness of these films is often given as 10%/90% with $Fe_2O_3$ being the thinner one.[13] The typical oxide thickness of the iron films studied was roughly 50 Å, which would suggest a $Fe_2O_3$ thickness of 5 Å. However, with such a thin film we would have extensive contributions to the Fe 2p spectra from the underlying $Fe_3O_4$, the detection depth being ~13 monolayers. We do see a slight attenuation of the Fe 2p spectra, especially of the shake-up feature at 719 eV, signifying a different underlying iron oxide species, though this decrease in intensity is much too small to suggest a 5 Å film. From our spectra, we estimate the thickness of the $Fe_2O_3$ layer to be roughly 15 Å. These estimates are also supported by the O/Fe ratio (~1.2) of the oxide layers ≧15 Å deep being slightly less than the ideal 1.33 for $Fe_3O_4$ as expected.

Samples were stored 24 hours at 70° C. in the humidity chamber and dramatic differences were detected. The iron films on EBP retained their surface composition of a ~15 Å thick top layer of $Fe_2O_3$, a ~35 Å thick layer of $Fe_3O_4$ beneath it, followed by the pure iron. The control samples of iron on glass and polyimide, however, were found to have $Fe_3O_4$ oxide layers in excess of 150 Å, though the topmost layer of these samples still consisted of a ~15 Å thick $Fe_2O_3$ film.

The corrosion protecting capability of EBP for CRS also was studied, with special emphasis on the possible effects on the corrosion process that the iron oxide layers might have. Eight different sample configurations are described in FIG. 3 and in Table I. XPS depth profiling was carried out for both pristine samples and those exposed to the corrosive environment. Samples were studied with and without protective undercoats of EBP and also with and without polishing with emery paper on either the top surface or the back side of the steel plates where EBP was subsequently deposited. All unpolished CRS surfaces (as received) were found to have a top $Fe_2O_3$ layer ~15 Å thick, with a ~95 Å thick $Fe_3O_4$ Å layer beneath it followed by the pure steel/iron. As in the case of the iron samples, the depth of the $Fe_2O_3$ layer is roughly estimated by the attenuation of the Fe 2p spectral features and the different, underlying iron oxide species is assumed to consist of $Fe_3O_4$ according to literature and again supported by the O/Fe ratio (~1.2). All polished CRS surfaces also had a top $Fe_2O_3$ layer ~15 Å thick, but with a thinner layer (~35 Å) of $Fe_3O_4$ between the top layer and the pure steel. Hence, as for the case of pure iron, all steel surfaces have the $Fe_2O_3/Fe_3O_4$ surface region composition, regardless of whether or not EBP has been applied as a protective coat. Typical XPS Fe 2p core level spectra of: (a) the top surface layer, (b) sputter-damaged iron oxide and (c) pure iron/steel are shown in FIG. 4. The weak shake-up feature at ~719 eV for (a) and the shake-up shoulder at ~716 eV for (b) are noteworthy. After storage in the humidity chamber for 24 hours at 70° C., XPS depth-profiling was carried out with the results summarized in Table I, where the composition and depth of the oxide layers prior to exposure is also given. For all samples, the Fe $2p_{3/2}$ peak binding energy was 710.8–711.0 eV, i.e., $Fe_2O_3$, except for sample configurations #1–3 which had binding energies of 711.5–711.7 eV indicating the presence of some FeOOH species at the surface.

TABLE I

Figure 3:
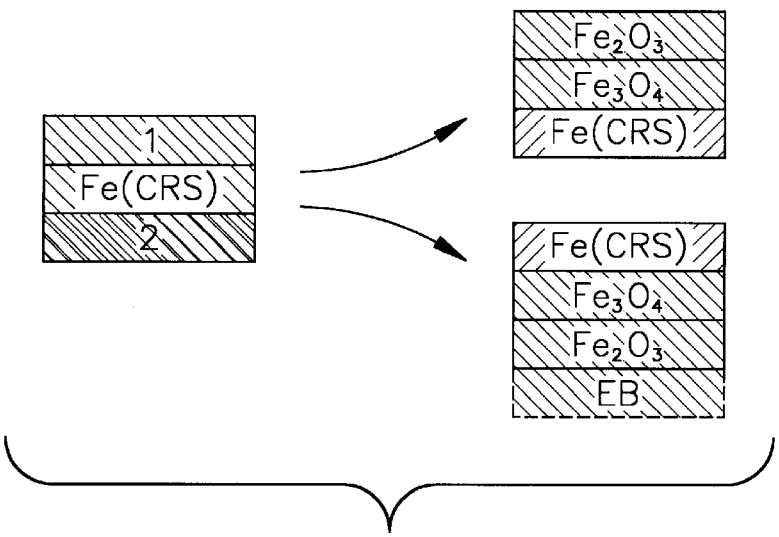
FIG. 3 is a schematic picture of a cold rolled steel sample, showing a detailed view of top oxide layer (1) and backside oxide layer (2) with possible emeraldine base polyaniline undercoating.
Figure 4:
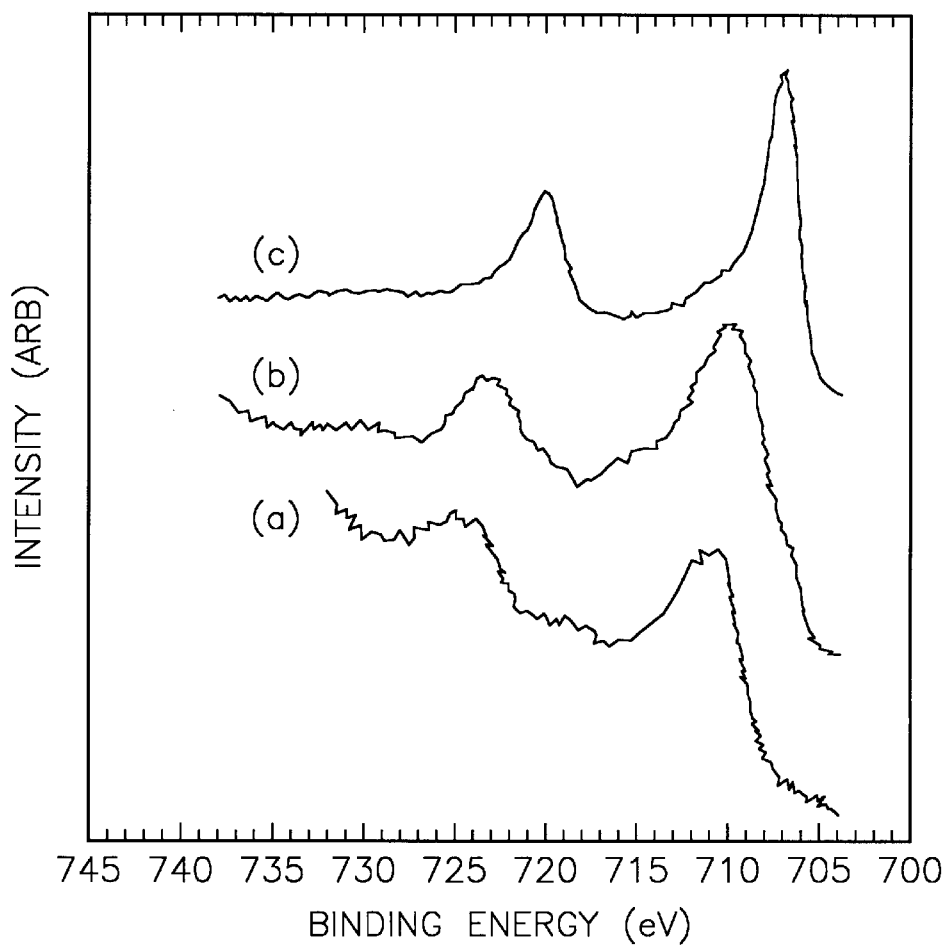
FIG. 4 shows a typical XPS Fe 2p core level spectra of: (a) top surface layer ($Fe_2O_3$), (b) FeO-hybrid (sputter damage) and (c) pure iron/steel for CRS samples.

Thickness of top oxide layers of CRS samples, see FIG. 3, before and after exposure to humid environment at 70°0 C. for 24 hours. "OX" means preexisting oxide layer, "—" means CRS surface has been polished by emery paper. "EBP" means the surface bears an EBP coating.

| | | | $Fe_2O_3$ (Å) | | $Fe_3O_4$ (Å) | | | |
|---|---|---|---|---|---|---|---|---|
| # | 1 | 2 | before | after | before | after | pitting | time |
| 1 | OX | OX | ~15 | ~15 | ~95 | >>300 | severe | 1 day |
| 2 | OX | OX/EBP | ~15 | ~15 | ~95 | >300 | alot | 1 day |
| 3 | OX | — | ~15 | ~15 | ~95 | >>300 | alot | 1 day |
| 4 | OX | EBP | ~15 | ~15 | ~95 | ~105 | some | 1 day |
| 5 | — | OX | ~15 | ~15 | ~35 | ~45 | little | 1 day |
| 6 | — | OX/EBP | ~15 | ~15 | ~35 | ~45 | little | 1 day |
| 7 | — | — | ~15 | ~15 | ~35 | ~35 | none | 1 day |
| 8 | — | EBP | ~15 | ~15 | ~35 | ~35 | none | 1 day |
| 9 | — | — | ~15 | ~15 | ~35 | >200 | severe | 2 days |
| 10 | — | EBP | ~15 | ~15 | ~35 | ~35 | none | 2 days |
| 11 | — | — | ~15 | ~15 | ~35 | >500 | severe | 7 days |
| 12 | — | EBP | ~15 | ~15 | ~35 | ~85 | little | 7 days |

The addition of a EBP protective undercoat increased the corrosion resistance of the steel when the thicker, preexisting oxide layer on the surface to be coated was removed prior to EBP deposition. Also, the samples where the top surface had been polished were found to be much more corrosion resistant than those with the original, thicker oxide layer present. In fact, after 24 hours of exposure at 70° C., the polished CRS samples (#7) had not begun to corrode. In order to differentiate between polished CRS with and without EBP protective undercoats, we extended the exposure times to up to 7 days and increased the temperature to 80° C. for sample configurations #7 and #8. After 48 hours, all polished CRS samples (#9) had begun to corrode, some severely with extensive pitting and $Fe_3O_4$ layers in excess of 200 Å. The EBP protected CRS samples (#10), however, still showed no signs of corrosion, retaining the typical ~15/35 Å $Fe_2O_3/Fe_3O_4$ surface region. After 7 days, the EBP protected samples (#12) had begun to show moderate corrosion damage, with the thickness of the $Fe_3O_4$ layer having grown from roughly 35 Å to 85 Å. In contrast, the unprotected CRS samples (#11) were now completely corroded with $Fe_3O_4$ layers of >500 Å in thickness.

Although not limited to the theory of operation of the invention, a "grain-boundaries pores" model[15] has been proposed for the humidity-induced corrosion of steel in the presence of an $Fe_2O_3/Fe_3O_4$ oxide layer. The steel corrodes at the $Fe_3O_4$/metal interface by diffusion of water molecules through 1 nm diameter pores that exist across the oxide layers down to the metal interface, where $Fe_3O_4$ is formed. The oxide formation induces the creation of $Fe^{2+}$ ions from the metal that diffuse up through the oxide along grain boundaries or through vacancy hopping. At the $Fe_2O_3/Fe_3O_4$ interface, $Fe^{2+}$ ions will react with water or $O^{2-}$ ions that have diffused down through the $Fe_2O_3$, forming predominantly $Fe_3O_4$. The current is balanced either by electrons diffusing up through the films or $H^+$ down through the films.

Although not intending to be limited to any mechanism upon which the invention operates, based on the aforementioned mechanism, one might propose the following model for the corrosion protection of Fe and CRS by EBP. By donating electrons into the LUMO (quinoid) level of EBP, a positive charge will initially be formed on the outer surface of the Fe/CRS metal at the EBP interface. Since iron and steel are metals, the charge will spread quickly to all the surfaces of the sample, creating a positively charged surface region ~0.5–1 Å thick[16]. Gauss' law also holds for the $Fe_3O_4$ layer, as it is a semimetal[17] with a conductivity of ~$10^2$ S/cm. Hence, it is expected that a charged layer will be built up at the $Fe_2O_3/Fe_3O_4$ interface instead of the $Fe_3O_4/Fe$ contact, $Fe_2O_3$ being a semiconductor[17]. The electronic structure of the $Fe_3O_4$ oxide in this region will be stabilized due to the electron deficiency, changing the chemical potential. This in turn will make it harder to (further) oxidize the iron ions and hence the steel samples becomes more resistant to corrosion. The charged layer at the $Fe_2O_3/Fe_3O_4$ interface will also hinder the diffusion of $Fe^{2+}$ ions up through the bulk to the interface and $O^{2-}$ ions from the surface down to the interface, which also will reduce the rate of corrosion. The charged layer will not prevent water molecules from diffusing down to the metal interface causing formation of $Fe_3O_4$, but the rate of this corrosion is much slower than that at the surface region, due to the space constraints.[15] This model is supported by X-ray and ultraviolet photoelectron spectroscopy carried out on thin EBP films spun onto iron substrates, which showed charge transfer ($e^-$) from the iron substrates to the EBP films. This model might explain why all surfaces of the CRS are protected from corrosion when an undercoat of EBP is applied. The reduced effectiveness of protection when the original, thicker $Fe_3O_4$ oxide layer is present on the non-coated surface is explained by the small (~0.1 $mm^{15}$) grain sizes of this oxide compared to the one grown after polishing, yielding improved diffusion of the ions and hence a faster rate of corrosion. The increase in effective surface area caused by the oxide will also decrease the corrosion protection. From this model, the oxide layer between the EBP film and the steel would decrease the effectiveness of the protective coat, as the oxide layer will decrease the charge transfer of electrons between the two materials. The larger work functions of the $Fe_2O_3$ and $Fe_3O_4$ oxides as compared with iron/CRS,[18] may also decrease the charge transfer and hence the corrosion protection. The thickness of the oxide as measured by XPS less than 4 minutes after polishing is ~5 Å, giving a good contact between the EBP and the CRS.

Figure 2:
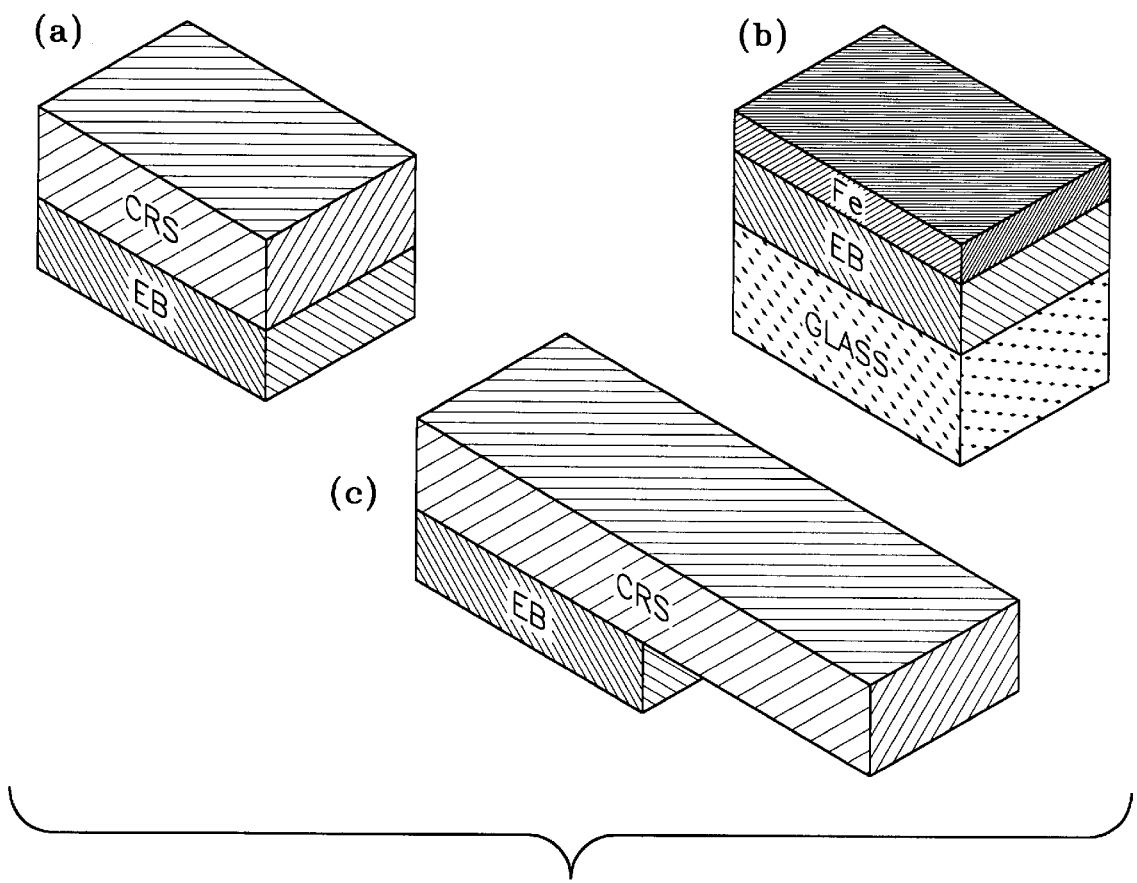
FIG. 2(a) is a schematic picture of a cold rolled steel (CRS) sample with an EBP undercoat 2(b) a sputtered iron film on an EBP-covered glass/polyimide substrate; and 2(c) a 1×3 $cm^2$ CRS sample with a 1×1.5 $cm^2$ undercoat of EBP.

Such a proposed mechanism for the corrosion protection would also suggest the possibility of large values of throwing power. Indeed, experiments carried out on 1×3 $cm^2$ (polished) CRS samples show such effects. When exposed to a humid environment at 80° C. for 48 hours, the control samples are severely corroded, whereas samples half covered (1×1.5 cm $^2$) with EBP, FIG. 2, showed little or no corrosion. When corrosion did occur, it began at the edges farthest way from the EBP undercoat. In some instances, spots of corrosion were also visible in random locations away from the edges, but these are likely to be caused by defects in the steel surface.

In summary, undercoats of emeraldine base polyaniline were found to provide excellent corrosion protection for iron and cold rolled steel. The iron oxide of the steel and iron surfaces, before and after corrosion, were studied and found to have a thin top layer of $Fe_2O_3$, estimated thickness of ~15 Å, followed by a thicker layer of $Fe_3O_4$. The removal of the thicker, preexisting oxide layers were found to substantially increase the corrosion resistance of the CRS itself, and further increased the corrosion protecting capabilities of the EBP undercoats. Accordingly, the EBP undercoats offer anodic protection of both steel and iron, as might be described by our model. Large values of throwing power, at least 15 mm, were demonstrated for EBP protected CRS.

FIGS. 5–13 show schematics of a corrosion studies provided for understanding the present invention.

Figure 5:
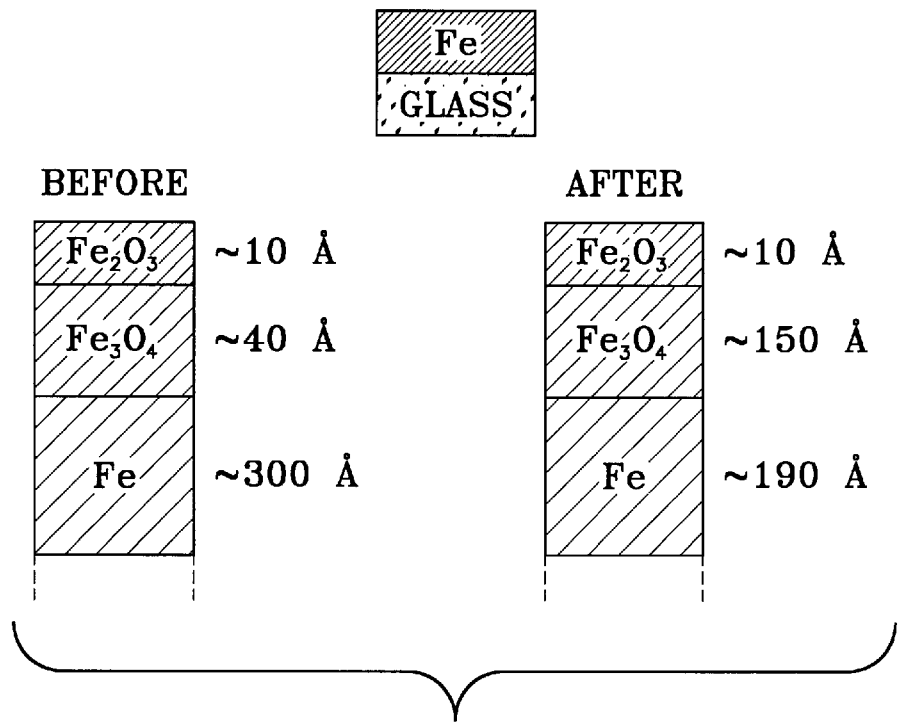
FIG. 5 is a schematic of a corrosion study provided for understanding the present invention.

FIG. 5 represents the results of a corrosion study of uncoated CRS on glass carried out at 70° C. over 1 day. The comparative results show an increase in the interfacial $Fe_3O_4$ layer.

Figure 6:
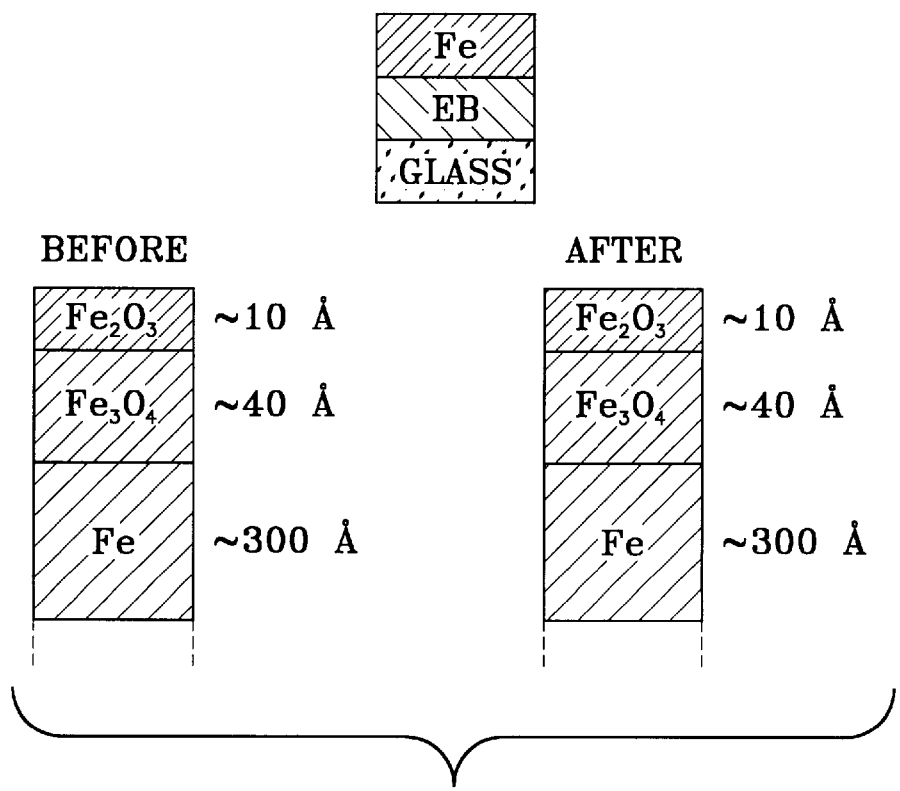
FIG. 6 is a schematic of a corrosion study provided for understanding the present invention.

FIG. 6 represents the results of a corrosion study of an EBP-undercoated CRS on glass carried out at 70° C. over 1 day. The comparative results show no increase in the interfacial $Fe_3O_4$ layer.

Figure 7:
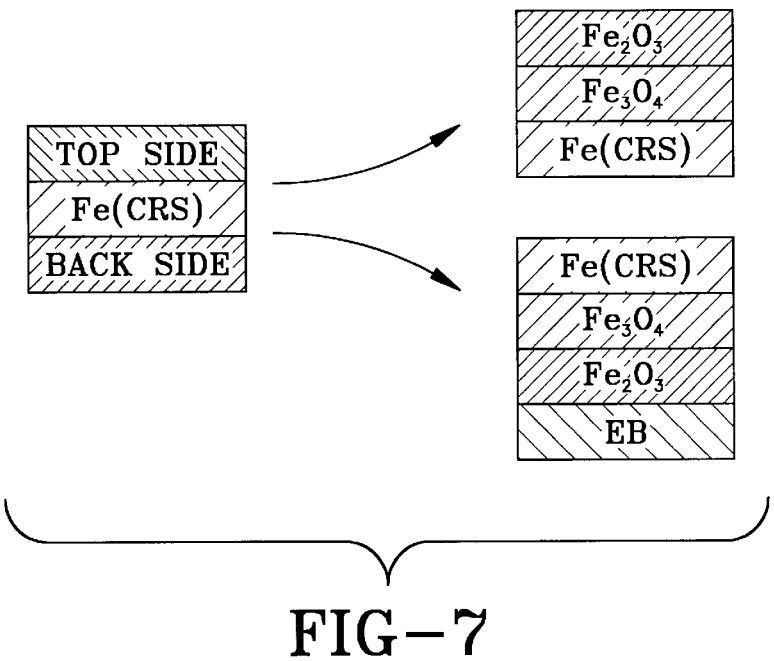
FIG. 7 is a schematic of a corrosion study provided for understanding the present invention.

FIG. 7 represents a detailed schematic of the top side and back side corrosion layers of a typical CRS sample.

Figure 8:
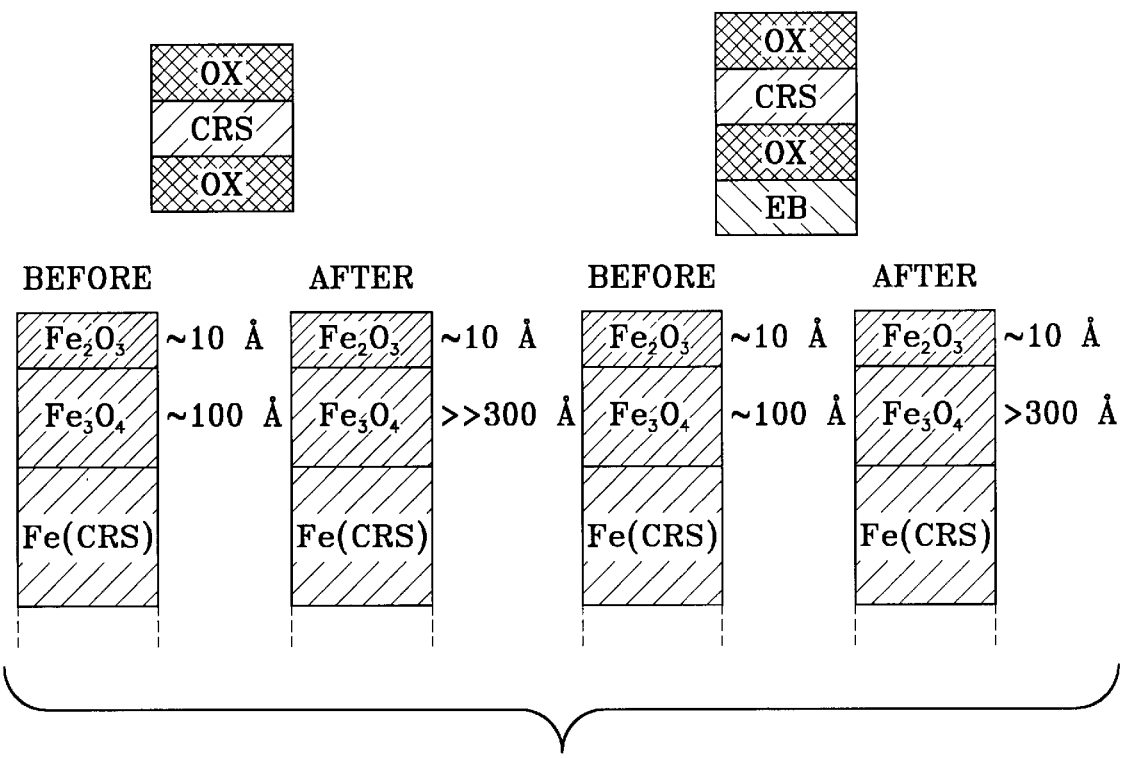
FIG. 8 is a schematic of a corrosion study provided for understanding the present invention.

FIG. 8 represents the results of a corrosion study of an EBP-undercoated CRS on glass carried out at 70° C. over 1 day. The comparative results show an increase in the interfacial $Fe_3O_4$ layer, evidencing that the EBP-undercoat when placed on the oxidized layer did not perform as well as the EBP-undercoated sample of the present invention, when compared to the corrosion growth in an uncoated CRS sample as a control.

Figure 9:
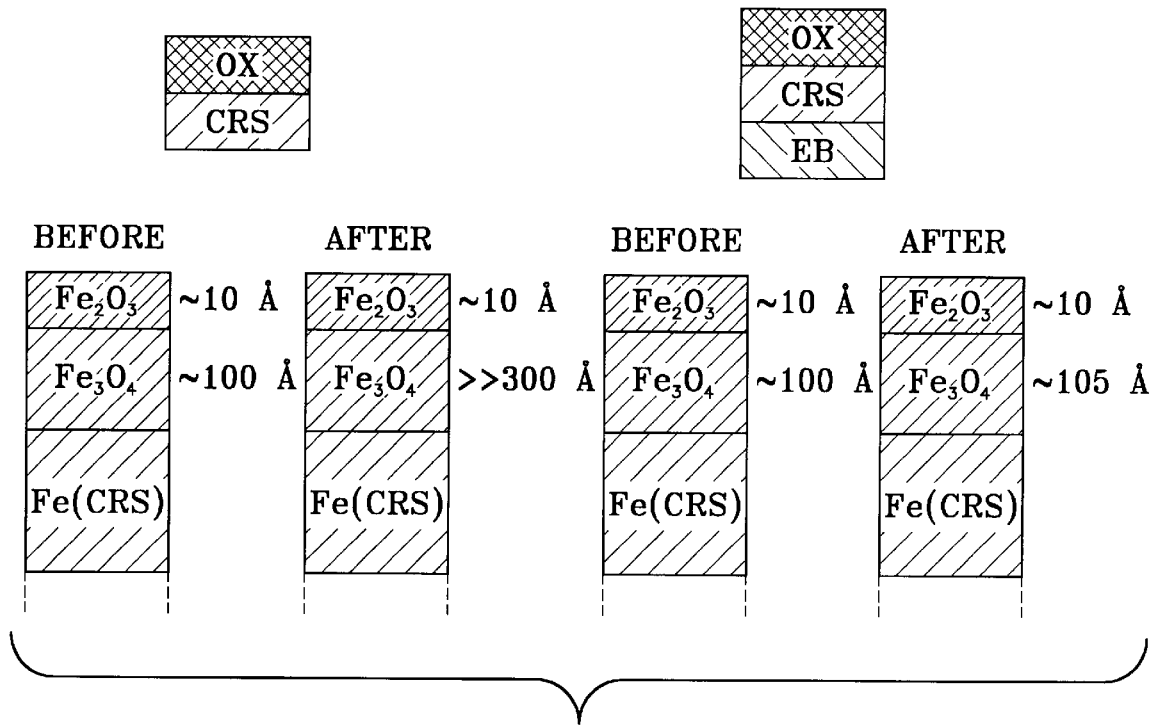
FIG. 9 is a schematic of a corrosion study provided for understanding the present invention.

FIG. 9 represents the results of a corrosion study of an EBP-undercoated CRS on glass carried out at 70° C. over 1 day. The comparative results show a preservation of the top interfacial $Fe_3O_4$ layer, evidencing that the EBP-undercoat when placed on the metal surface after removal of the oxidized layer performed better than EBP-undercoated sample shown in FIGS. 8 and 9, and when compared to the corrosion growth in an uncoated CRS sample with the bottom oxidized layer removed, as a control.

Figure 10:
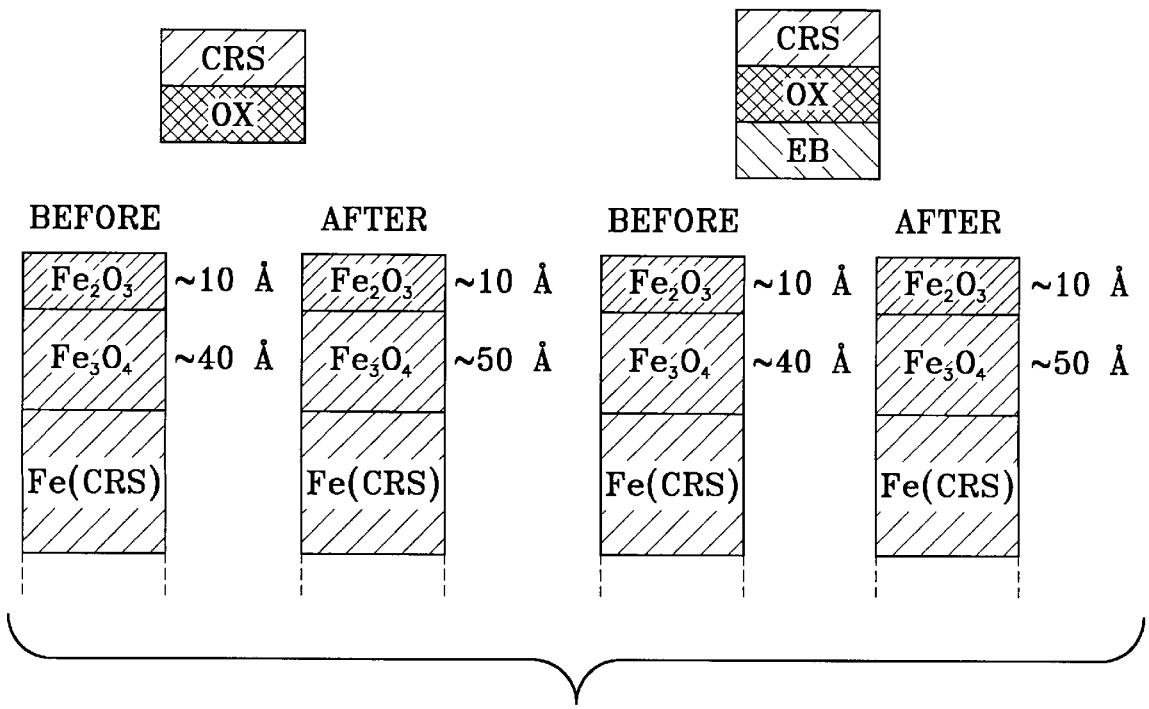
FIG. 10 is a schematic of a corrosion study provided for understanding the present invention.

FIG. 10 represents the results of a corrosion study of an EBP-undercoated CRS on glass carried out at 70° C. over 1 day. The comparative results shows relatively no difference in the degree of preservation of the top interfacial $Fe_3O_4$ layer. This experiment shows that the EBP-undercoat when placed on the metal surface and atop the oxidized layer performed about the same when compared to the corrosion growth in an uncoated CRS sample with the top oxidized layer removed, as a control. This may be accounted for by the short-term (i.e. 1 day) corrosion resistance of the initially forming $Fe_2O_3$ layer. Compare to FIG. 12.

Figure 11:
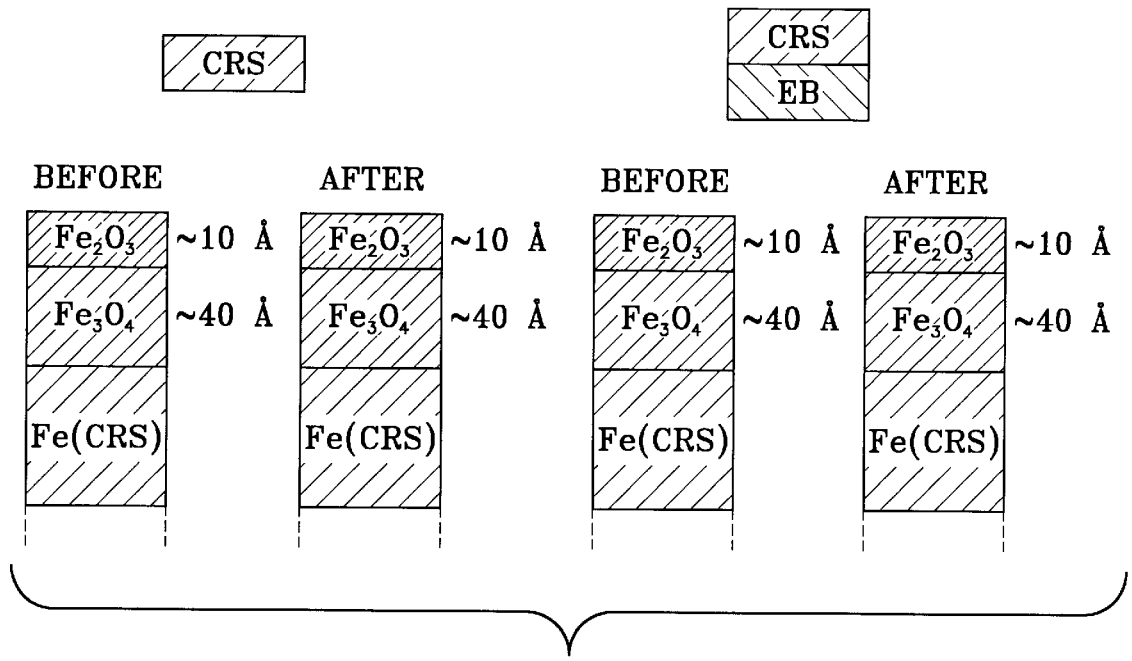
FIG. 11 is a schematic of a corrosion study provided for understanding the present invention.
Figure 12:
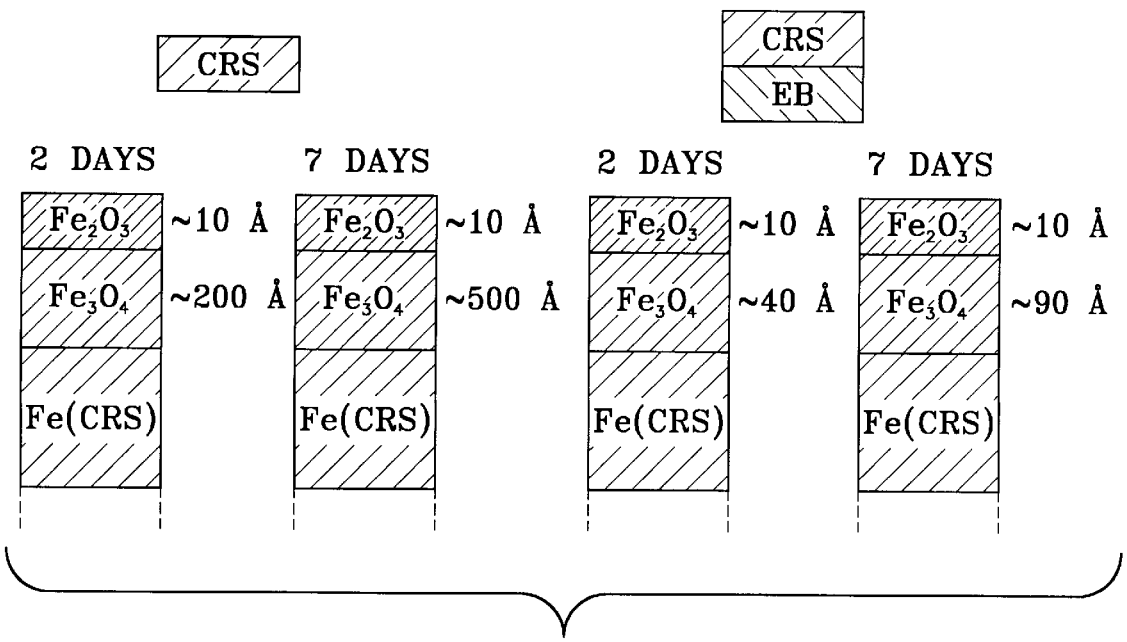
FIG. 12 is a schematic of a corrosion study provided for understanding the present invention.

Likewise, FIG. 11 represents the results of a corrosion study of an EBP-undercoated CRS on glass carried out at 70° C. over 1 day. The comparative results shows relatively no difference in the degree of preservation of the top interfacial $Fe_3O_4$ layer. This experiment shows that the EBP-undercoat when placed on the metal surface after removal of the oxidized layer performed about the same when compared to the corrosion growth in an uncoated CRS sample with the both top and bottom oxidized layers removed, as a control. This may be accounted for by the short-term (i.e. 1 day) corrosion resistance of the initially forming $Fe_2O_3$ layer. Compare to FIG. 12. Finally, FIG. 12 represents the results of a corrosion study of an EBP-undercoated CRS on glass carried out at 80° C. over 2 and 7 days. The comparative results shows a significant difference in the degree of preservation of the top interfacial $Fe_3O_4$ layer at both 2 and 7 days. This experiment shows that the EBP-undercoat when placed on the metal surface after removal of the oxidized layer performed much better as compared to the corrosion growth in an uncoated CRS sample with the both top and bottom oxidized layers removed, as a control. This may be accounted for by the ultimate decay, over a longer term (i.e., 2 and 7 days), of the corrosion resistance of the initially forming $Fe_2O_3$ layer. The foregoing results show that the articles of the present invention performed significantly better than corresponding articles bearing EBP-undercoat placed on the metal surface prior to removal of the oxidized layer.

References

The following references are hereby incorporated herein by reference:

[1] N. Ahmad and A. G. MacDiarmid, *Synth. Met.* 78 (1996) 103.
[2] H. H. Uhlig and R. W. Revie, *Corrosion and Corrosion Control*, Wiley-Interscience, New York 1985.
[3] B. Wessling, *Adv. Mater.* 6 (1994) 226.
[4] D. W. DeBerry, *J. Electrochem. Soc.* 132 (1985) 1022.
[5] W-K. Lu, R. L. Elsenbaumer, and B Wessling,. *Synth. Met.* 71 (1995) 2163.
[6] D. A. Wrobleski, B. C. Benicewicz, K. G. Thompson, and C. J. Bryan, *ACS Polymer Preprints* 35 (1994) 265.
[7] Y. Wei, J. Wang, X. Jia, J-M. Yeh, and P. Spellane, *Polymeric Materials Science & Engineering* 72 (1995) 563.
[8] S. Jasty and A. J. Epstein, *Polymeric Materials Science & Engineering* 72 (1995) 565.
[9] A. G. MacDiarmid, J. C. Chiang, A. F. Richter, N. L. D. Somasiri, and A. J. Epstein, in L. Alcear, (Ed.) *Conducting Polymers*, p 105 D. Reidel Publishing Co., Dodrecht, Netherlands, 1987.
[10] N. S. McIntyre and D. G. Zetaruk, *Anal. Chem.*, 49 (1977) 1521.
[11] J. S. Corneille, J-W He, and D. W. Goodman, *Surf. Sci.* 338 (1995) 211.
[12] M. Seo, J. B. Lumsden, and R. W. Staehle, *Surf Sci.* 50 (1975) 541.
[13] D. A. Channing and M. J. Graham, *Corr. Sci.* 12 (1972) 271.
[14] F Gazzarini and G. Lanzavecchia, *Reactiv. Solids, Proc. Int. Symp.*, 6th (1969), 1968, 57–64. Editor(s): J. W. Mitchell, Wiley-Intersci., New York, N.Y.
[15] J. Robertson, Corr. Sci. 29 (1989) 1275.
[16] W. Mönch, *Semiconductor Surfaces and Interfaces, Springer Series in Surface Sciences* 26, Springer-Verlag, Berlin, 1993.
[17] Y. Mei, Z. J. Zhou, and H. L. Luo, *J. Appl. Phys.* 61 (1987) 4388.
[18] J. Nowotny and I. Sikora, *J. Electrochem. Soc.* 125 (1978) 781.

U.S. Provisional Patent Application Ser. No. 60/022,794 is hereby incorporated herein by reference.

In view of the foregoing disclosure of the present invention, or through its practice, it will be within the ability of one skilled in the art to make modifications to the present inventions, such as through equivalent process steps, or equivalent materials, without departing from the spirit of the invention as reflected in the appended claims.

What is claimed is:

1. A method of providing an anodic coating to a member having a ferrous metal surface being subject to oxidation, said method comprising:
    (a) obtaining a member having a ferrous metal surface, said ferrous metal surface having a layer of oxidized ferrous metal said layer of oxidized ferrous metal comprising a layer of $Fe_2O_3$ and a layer of $Fe_3O_4$;
    (b) removing at least a portion of said layer of oxidized ferrous metal from said ferrous metal surface so as to reduce the thickness of said layer of $Fe_3O_4$; and
    (c) depositing at least one layer of an emeraldine base polyaniline polymer onto said ferrous metal surface.

2. A method according to claim 1 wherein said ferrous metal is selected from the group consisting of iron and steel.

3. A method according to claim 1 wherein said emeraldine base polyaniline polymer is an emeraldine base polyaniline oligomer.

4. A method according to claim 1 wherein said emeraldine base polyaniline polymer having carbon ring structures, and wherein said carbon ring structures are substituted.

5. A method according to claim 1 wherein said at least one layer of emeraldine base polyaniline polymer is deposited onto said ferrous metal surface by a method selected from the group consisting of solution deposition, electrochemical deposition and vacuum deposition.

6. A member having an anodic coating prepared in accordance with the method of claim 1.

7. A member having an anodic coating prepared in accordance with the method of claim 2.

8. A member having an anodic coating prepared in accordance with the method of claim 3.

9. A member having an anodic coating prepared in accordance with the method of claim 4.

10. A member having an anodic coating prepared in accordance with the method of claim 5.

* * * * *

UNITED STATES PATENT AND TRADEMARK OFFICE
CERTIFICATE OF CORRECTION

PATENT NO. : 5,972,518
DATED : October 26, 1999
INVENTOR(S) : Arthur J. Epstein, et al.

It is certified that error appears in the above-identified patent and that said Letters Patent is hereby corrected as shown below:

In column 2, line 5, please delete the word "arc" and replace it with --are--.

Signed and Sealed this

Sixth Day of June, 2000

Attest:

Q. TODD DICKINSON

Attesting Officer

Director of Patents and Trademarks